United States Patent
Witherell et al.

(10) Patent No.: US 10,440,665 B1
(45) Date of Patent: Oct. 8, 2019

(54) DYNAMIC CONTROL OF POWER-BACKOFF BASED ON WORST-CASE IM3 ANALYSIS

(71) Applicant: Sprint Spectrum L.P., Overland Park, KS (US)

(72) Inventors: Michael Witherell, Portland, OR (US); Ankit Muchhala, Leesburg, VA (US); Zheng Fang, Mclean, VA (US); Herkole Sava, Centreville, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/102,043

(22) Filed: Aug. 13, 2018

(51) Int. Cl.
*H04B 15/00* (2006.01)
*H04W 52/36* (2009.01)
*H04W 24/08* (2009.01)
*H04W 52/14* (2009.01)
*H04L 25/03* (2006.01)
*H04L 5/14* (2006.01)

(52) U.S. Cl.
CPC ......... *H04W 52/367* (2013.01); *H04W 24/08* (2013.01); *H04W 52/146* (2013.01); *H04L 5/1469* (2013.01)

(58) Field of Classification Search
CPC . H04W 52/367; H04W 24/08; H04W 52/146; H04L 5/1469

USPC ................ 375/219, 220, 222, 295, 296, 297
See application file for complete search history.

(56) References Cited

U.S. PATENT DOCUMENTS

| | | | |
|---|---|---|---|
| 9,473,286 B1 | 10/2016 | Shipley et al. | |
| 2008/0130589 A1* | 6/2008 | Gorokhov | H04L 5/0007 370/336 |
| 2016/0262111 A1* | 9/2016 | Boudreau | H04W 76/14 |
| 2019/0020405 A1* | 1/2019 | Smith | H04B 7/18513 |

* cited by examiner

*Primary Examiner* — Tesfaldet Bocure (57) ABSTRACT

When a UE is going to engage concurrently in a first transmission on a first channel and a second transmission on a second channel, the UE will apply a level of power-backoff for the first transmission, with the level of power-backoff being dynamically established (i) based on a prediction of what PSD-limited frequency in the nearest IM3 product will have the highest PSD and (ii) based on a mapping between that predicted worst-case frequency to an associated power-backoff value. For instance, considering the IM3 product nearest in frequency to the first transmission, a determination could be made as to what portion of the IM3 product is subject to a PSD limit. And a prediction could be made as to what frequency within that frequency range will have the highest PSD. That predicted worst-case frequency could then be mapped to an associated power-backoff value, and the UE could be configured accordingly.

20 Claims, 7 Drawing Sheets

DYNAMIC CONTROL OF POWER-BACKOFF BASED ON WORST-CASE IM3 ANALYSIS

BACKGROUND

A cellular wireless network typically includes a number of base stations that are configured to provide wireless coverage areas, such as cells and cell sectors, in which user equipment devices (UEs) such as cell phones, tablet computers, tracking devices, embedded wireless modules, and other wirelessly equipped communication devices (whether or not user operated), can operate. In turn, each base station could be coupled with network infrastructure that provides connectivity with one or more transport networks, such as the public switched telephone network (PSTN) and/or the Internet for instance. With this arrangement, a UE within coverage of the network could engage in air interface communication with a base station and could thereby communicate via the base station with various remote network entities or with other UEs served by the base station.

Such a network could operate in accordance with a particular air interface protocol (or radio access technology), with communications from the base stations to UEs defining a downlink or forward link and communications from the UEs to the base stations defining an uplink or reverse link.

In accordance with the air interface protocol, each coverage area could operate on a carrier, which could be frequency division duplex (FDD), defining separate frequency channels for downlink and uplink communication, or time division duplex (TDD), with a single frequency channel multiplexed over time between downlink and uplink use. Further, on the downlink and uplink, the carrier could be structured to define various physical channels for carrying information between the base stations and UEs.

Over the years, the industry has embraced various "generations" of air interface protocols, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

As the industry advances from one generation of wireless air interface technology to the next, issues arise with the need for UEs to support potentially multiple air interface protocols at once. With the transition from 4G to 5G, for instance, it is expected that UEs will be configured to support use of both technologies concurrently, with an arrangement referred to as EUTRA-NR Dual Connectivity (EN-DC). With such an arrangement, a UE might include a 4G radio and a 5G radio, with the 4G radio being served by a 4G base station concurrently with the 5G radio being served by a 5G base station. This arrangement could help support transition from 4G technology to 5G technology and may provide other benefits as well.

OVERVIEW

Disclosed are methods and systems to help address technological issues associated with implementing multiple radios concurrently in a UE, particularly where the radios may be engaging in uplink transmission at the same time as each other. This situation may arise, for instance, as the industry transitions from 4G to 5G NR.

To support the 4G to 5G transition, a UE could be configured with discrete 4G and 5G modems that are set to operate on respective carriers in a common frequency band or in separate frequency bands. Each modem could include a baseband modem and RF integrated circuitry (RFIC) interconnected over an I/Q bus. In the transmit (uplink) direction, the device could then include a separate RF transmit chain with a bandpass filter and one or more transmit antennas respectively for each modem. And in the receive (downlink) direction, the device could have a single or multiple RF chains, with the receive signal passing to both the 4G modem and 5G modem for processing.

With such an arrangement, the UE could be set to support EN-DC, with its 4G modem operating as a master controller and its 4G air interface connection functioning as an anchor. For instance, the UE could use its 4G modem to acquire a 4G radio-link-layer connection (e.g., Radio Resource Configuration (RRC) connection) with a 4G base station (Node-B (NB)), and RRC signaling over that connection could then provide for setup of a 5G radio-link-layer connection between the UE's 5G modem and a 5G NB, likely collocated with the 4G NB. Once these two radio-link-layer connections are established, data communication on each connection can operate with its own respective physical layer, media access control (MAC) layer, and radio-link-control (RLC) layer processing, such as to facilitate scheduling of communications, channel state reporting, and the like.

Unfortunately, however, uplink transmission by a UE concurrently on two different frequency channels (e.g., in EN-DC) can give rise to third-order intermodulation-distortion (IM3) products or the like that are subject to industry specifications or government regulations limiting the power of emissions outside of a serving channel. In particular, the concurrent uplink transmissions could give rise to a lower IM3 product that is at least partially below (lower in frequency than) the two channels and an upper IM3 product that is at least partially above (higher in frequency than) the two channels. And the power spectral density (PSD) (e.g., dBm/MHz) of each such IM3 product may be subject to industry or governmentally imposed spectral emission masks (SEMs) and other restrictions on PSD for emissions occurring outside of an operating channel.

An example SEM defines two PSD limits based on how far away in frequency the emission is from the nearest edge of the channel at issue. In particular, the example SEM defines (i) a first, relatively relaxed limit of −13 dBm/MHz for emissions that are within one channel bandwidth above or below the channel and (i) a second, more strict limit of −25 dBm/MHz for emissions that are farther than one channel bandwidth above or below the channel. For non-contiguous channels, a separate SEM may be defined for each channel, based on the channel's bandwidth and in relation to the channel's position in frequency spectrum, whereas for contiguous channels, a single SEM may be defined for an aggregate of the channels. Further, there may additional PSD limitations; for instance, in a certain defined frequency range (e.g., frequencies below 2490.5 Hz), emissions might be subject to the strict limit of −25 dBm/MHz.

It is important to ensure that the lower and upper IM3 products resulting from interaction between a UE's concurrent transmissions on two channels do not exceed these limits.

In general, the PSD of each IM3 product will be a linear function of the PSD of the two transmissions. In particular, given concurrent lower-frequency transmission TrLow and higher-frequency transmission TrHigh, the PSD of the lower IM3 product is related to the PSDs of the two transmissions as follows:

$$\log(PSD_{IM3\_Low}) \propto (2*\log(PSD_{TrLow}) + \log(PSD_{TrHigh})),$$

and the PSD of the higher IM3 product is related to the PSDs of the two transmissions as follows:

$$\log(PSD_{IM3\_High}) \propto (2*\log(PSD_{TrHigh}) + \log(PSD_{TrLow})),$$

(These relationships are expressed here with the proportional symbol, as there may be constants or other values involved as well.)

As a result, one way to control the PSD of each IM3 product is to limit the PSDs of the underlying transmissions, by applying power-backoff. For instance, if the UE is generally configured with a maximum transmission power level (e.g., per modem), a maximum-power reduction (MPR) could be imposed based on industry specifications or governmental regulations, and an additional maximum-power reduction (A-MPR) could be imposed to help control PSD of IM3 products.

Unfortunately, however, limiting the power of the UE's transmissions can result in reduced effective coverage and throughput. Therefore, if power reduction is to be applied as a way to limit PSD of IM3 products, it would be best to determine and set the level of power-backoff as accurately as possible, in order to impose only so much power-backoff as would be needed to comply with SEM requirements.

Disclosed is a mechanism to help achieve this.

In accordance with the disclosure, when a UE is going to engage concurrently in a first transmission on a first channel and a second transmission on a second channel, the UE will be configured to apply a level of power-backoff for the first transmission, with the level of power-backoff being dynamically established (i) based on a prediction of what PSD-limited frequency in the nearest IM3 product will have the highest PSD and (ii) based on a mapping between that predicted worst-case frequency to an associated power-backoff value.

In particular, considering the IM3 product nearest in frequency to the first transmission, a determination could be made as to what portion (if any) of the IM3 product is subject to a PSD limit. And considering the frequency range of that portion, a prediction could be made as to what frequency within that frequency range will have the highest PSD. Through a mapping-table lookup, that predicted worst-case frequency could then be mapped to an associated power-backoff value. And based on the mapping, the UE could be configured to apply that power-backoff value.

This process is based on several technological considerations.

First, as shown by the equations discussed above, the PSD of each IM3 product will be more heavily influenced by the PSD of the transmission nearest in frequency to that IM3 product than by the PSD of the more distant transmission. Because of this, the act of controlling the power-backoff for a given transmission can reasonably be used to limit the PSD of the IM3 product that is nearest to that transmission.

Second, the frequency range of each IM3 product is predictable based on the frequency ranges of the two underlying transmissions. In particular, given concurrent transmissions TrLow and TrHigh at respective lower frequency $F_{TrLow}$ and higher frequency $F_{TrHigh}$, the frequency $F_{IM3\_Low}$ of the lower IM3 product can be predicted as $$F_{IM3\_Low} = 2*F_{TrLow} - F_{TrHigh},$$

and the frequency $F_{IM3\_High}$ of the higher IM3 product can be predicted as $$F_{IM3\_High} = 2*F_{TrHigh} - F_{TrLow}.$$

More particularly, if the lower transmission spans a frequency range from $F_{TrLow\_low}$ to $F_{TrLow\_high}$ and the higher transmission spans a frequency range from $F_{TrHigh\_low}$ to $F_{TrHigh\_high}$, then the frequency range of the lower IM3 product can be predicted to span a frequency range from $F_{IM3\_Low\_low}$ to $F_{IM3\_Low\_high}$, where $$F_{IM3\_Low\_low} = 2*F_{TrLow\_low} - F_{TrHigh\_high}$$

and $$F_{IM3\_Low\_high} = 2*F_{TrLow\_high} - F_{TrHigh\_low},$$

and the frequency range of the higher IM3 product can be predicted to span a frequency range from $F_{IM3\_High\_low}$ to $F_{IM3\_High\_high}$, where $$F_{IM3\_High\_low} = 2*F_{TrHigh\_low} - F_{TrLow\_high}$$

and $$F_{IM3\_High\_high} = 2*F_{TrHigh\_high} - F_{TrLow\_low}.$$

Because of this, the frequency range of an IM3 product that will be produced nearest to a given transmission can be predicted, to facilitate then determining what portion if any of that IM3 frequency range is subject to a PSD limit and, in turn, to predict what frequency in that portion will have the highest PSD and thus be the worst-case frequency for purposes of mapping to a power-backoff value.

And third, the bandpass filter that the UE applies for its uplink transmissions will generally trail off outside of its passband (and perhaps somewhat inside and near the edge of the passband) and will therefore increasingly attenuate transmissions the farther the transmissions are from its passband. Because of this, the PSD within a PSD-limited portion of an IM3 frequency range will be highest at the portion's edge that is closest in frequency to the nearby transmission. And consequently, that frequency can be deemed to be the worst-case frequency for purposes of mapping to a power-backoff value.

Considering these factors in combination, a UE could set its power-backoff for a given transmission to a level that is just enough to sufficiently limit the highest PSD in a PSD-limited portion of the IM3 product nearest to that transmission. And doing so could work to sufficiently limit the PSD of that IM3 product as a whole, without unduly restricting coverage or throughput.

These as well as other aspects and advantages will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of dual-connectivity with 4G LTE and 5G NR, where a UE operates on those two air interface protocols concurrently in a common frequency band, e.g., where the UE operates on a TDD 4G carrier in the band while operating on a separate TDD 5G carrier in the same band, and where the UE engages concurrently in transmission on the 4G carrier and transmission on the 5G carrier.

However, it will be understood that principles disclosed herein could be extended to apply with respect to other dual-connectivity scenarios, such as with respect to other air interface protocols, and possibly with the UE operating carriers in separate frequency bands. Further, the disclosed principles could also apply to other scenarios where a UE engages in transmission concurrently on two or more separate frequency channels, such as with carrier aggregation service or the like, with or without dual-connectivity.

In addition, even within the context of a representative 4G-5G dual-connectivity scenario, it will be understood that numerous variations from the specific arrangements and processes described are possible. For instance, various described circuits, connections, functions, and other features could be added, omitted, distributed, re-located, re-ordered, combined, or changed in other ways.

As noted above, FIG. 1 is a simplified block diagram of an example network arrangement in which aspects of the present disclosure can be implemented. Shown in the figure is a representative UE 12, which could be any of the types of devices noted above or others now known or later developed. The UE is shown in coverage of a 4G NB 14 and also within coverage of a 5G NB 16. Though shown separately in the figure, the 4G NB and 5G NB could be collocated, such as being implemented with a common base station antenna tower and separate 4G and 5G base station radios. Alternatively, the two NBs could be positioned separately.

Figure 1:
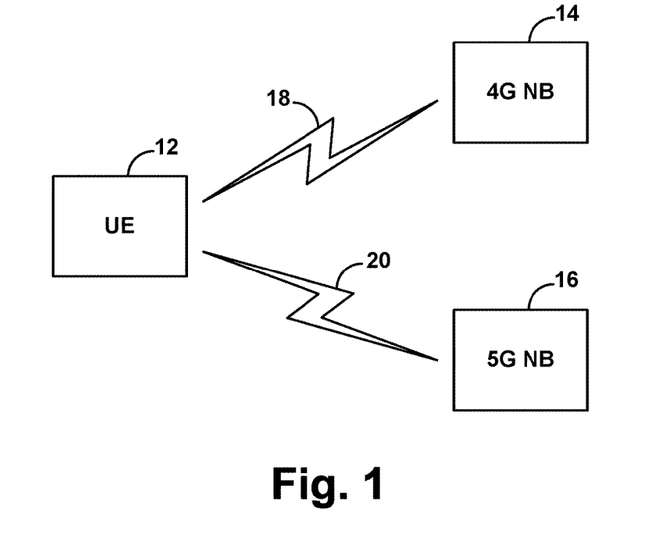
FIG. 1 is a simplified block diagram of an example network arrangement in which aspects of the present disclosure can be implemented.

In the arrangement shown, the 4G NB provides a 4G air interface 18, and the 5G NB provides a 5G air interface 20. In an example implementation, each of these air interfaces could be structured to use Orthogonal Frequency Division Multiple Access (OFDMA) on its downlink and Single-Carrier Frequency Division Multiple Access (SC-FDMA) on its uplink, but the specific structure and operation of these air interfaces may differ. For example, the 5G air interface may support variable subcarrier spacing and other advanced features associated with possible 5G NR operation, and the 5G air interface may support other features that the 4G air interface does not.

As shown, the representative NBs are in communication with each other through a network interface, which enables the NBs to interoperate, to help support dual-connectivity operation of UEs such as UE 12. Further, although not shown, each NB could be interconnected with network infrastructure (e.g., a core access network), such as one or more gateways, controllers, and the like, providing connectivity with one or more transport networks such as the Internet for instance, so as to enable UEs such as UE 12 to engage in wireless communication on the transport network (s) and perhaps with other served UEs.

Figure 2:
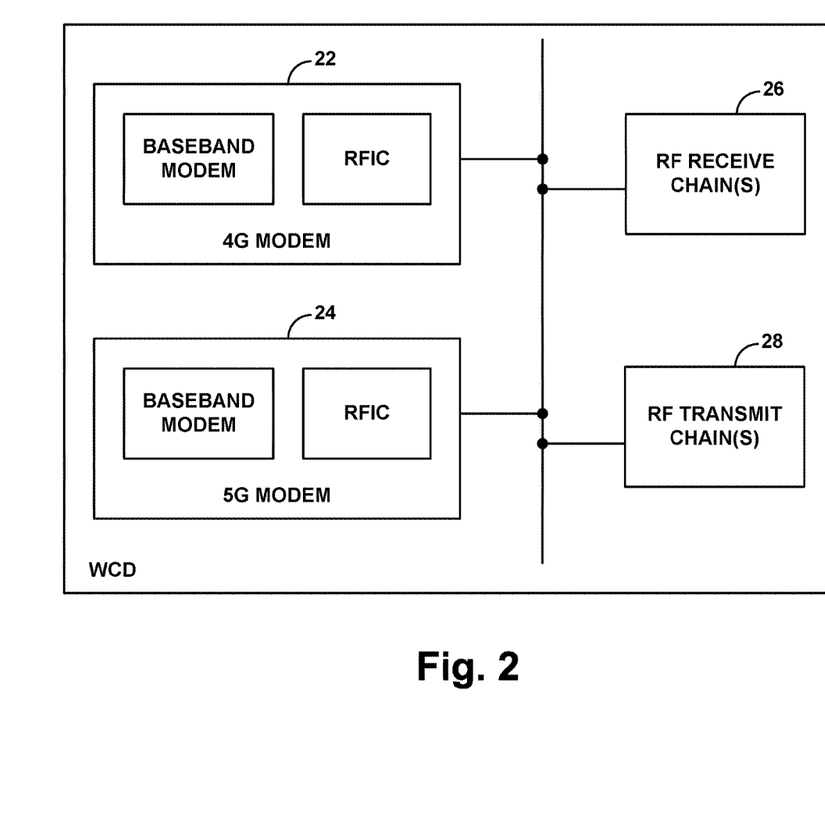
FIG. 2 is a simplified block diagram of an example UE.

FIG. 2 is next a simplified block diagram showing some of the components that can be included in a representative UE such as UE 12, to facilitate dual-connectivity service. As shown, the UE includes a 4G modem 22 and a 5G modem 24. These modems could be provided on a common integrated-circuit chipset within the UE or on separate chipsets within the UE. In either case, the modems could be interconnected by a signaling channel (e.g., bus) within the UE, enabling the modems to engage in signaling communication with each other.

Each modem is optimally configured to operate according to its respective air interface protocol. Further, each modem may be configured to carry out operations as presently disclosed. To facilitate carrying out these and other operations, each modem could include a processing unit (e.g., one or more microprocessors), non-transitory data storage (e.g., one or more volatile and/or non-volatile storage components, such as flash or EEPROM storage), and program instructions stored in the data storage and executable by the processing unit to implement the disclosed operations. Further, each modem could further include various components and interconnections to enable the modem to interoperate with other components of the UE, to additionally facilitate implementing various disclosed features.

In the simplified arrangement shown, each modem includes a baseband modem for handling physical layer and MAC layer processing, such as modulation and coding, and each modem further includes an RFIC for interfacing with RF transmit and receive chains. Each modem's RFIC could be interfaced with the modem's baseband modem by an I/Q bus, for carrying I/Q symbols between the RFIC and the baseband modem. And each modem's RFIC could be responsible for analog-digital conversion to convert between over-the-air analog RF communications and digital representations of the communications that its baseband modem has processed or can process.

As further shown, the UE includes one or more downlink RF receive chains 26 and one or more uplink RF transmit chains 28. These RF receive and transmit chains are shown in this figure as simplified blocks. In practice, the blocks could include various antennas, filters, amplifiers, splitters, and/or other components. And the antennas could include one or more antennas, with separate antennas provided for downlink and uplink communication and/or antennas shared between downlink and uplink communication. In a likely implementation, for instance, the UE would include multiple downlink antennas and multiple uplink antennas, to facilitate robust air interface communication. But other arrangements are possible as well.

Each modem 22, 24 could support establishment of a respective radio-link-layer connection with its respective NB on a respective carrier, using procedures now known or later developed. In a representative dual-connectivity scenario, the 4G modem 22 could function as an anchor. The 4G modem could establish its own radio-link-layer connection (e.g., RRC connection) on a 4G carrier with the 4G NB 14 first so as to enable the UE to engage in 4G data communication served by the 4G NB. (For instance, the UE could engage in random access channel (RACH) signaling and then RRC signaling with the 4G NB.) Through communication between the 4G NB 14 and the 5G NB 16, and through corresponding communication between the 4G modem 22 and the 5G modem, signaling to establish a 5G radio-link-layer connection (e.g., RRC connection) on a 5G carrier between the 5G modem and the 5G NB could then flow over the established 4G RRC connection.

Through this process, the UE could thus have an established 4G connection over a 4G carrier between its 4G modem and the 4G NB and, concurrently, an established 5G connection over a 5G carrier between its 5G modem and the 5G NB. These 4G and 5G carriers may be in a common frequency band (such as Band 41 (B41) or another band) or may be in different frequency bands. Further, each carrier could be TDD or FDD, in either case including a respective uplink frequency channel that is centered at specific frequency position in RF spectrum and that has a channel bandwidth defining a frequency range extending from a low-end frequency to a high-end frequency.

With these connections established, each respective NB could serve the UE according to the NB's respective air interface protocol.

For instance, when the UE has data to transmit over either of the connections to a respective NB, the UE could transmit to the NB a scheduling request that indicates the extent of data to be transmitted. In response, the NB could then allocate for use by the UE a specific range of frequency within the uplink channel of the serving carrier and could transmit to the UE a scheduling directive that indicates the allocated frequency range. And the UE could then transmit the data within that allocated frequency range to the NB, for receipt and processing by the NB.

Under example 4G and 5G air interface protocols, air interface communication between a UE and an NB could occur on a per transmission-time-interval (TTI) basis. In particular, the air interface could be divided into a continuum of 10-millisecond frames, each subdivided into ten 1-millisecond subframes or TTIs. On a TDD carrier that defines a particular range of frequency multiplexed over time between downlink and uplink communication, certain TTIs per frame could be designated for downlink use, while other TTIs per frame could be designated for downlink use, according to a TDD-configuration or frame configuration.

Within each uplink TTI, the carrier's frequency bandwidth could then be divided into allocable physical resource blocks (PRBs), such as 180-kHz-wide blocks. These or other frequency resources might constitute the smallest allocable frequency resource segments for data communication, although variations may be possible. Further, for uplink communication, NB may allocate one or more such PRBs defining a contiguous frequency range within the uplink channel. For instance, the NB could select one or multiple contiguous PRBs within a given uplink TTI and could send to the UE a scheduling directive that directs the UE transmit in on the indicated PRB(s), to cause the UE to engage in the uplink transmission using the associated uplink frequency range of the indicated PRB(s). In practice, the PRBs across the uplink channel could be numbered, and the scheduling directive could specify the allocated PRB(s) by their numbers, such as a range of PRB numbers. Further, the scheduling directive could direct the UE to use a particular modulation and coding scheme and could specify one or more other parameters (such as a designated antenna configuration or the like). The UE could thus engage in the transmission accordingly in the specified uplink frequency range.

In addition, while each NB is serving the UE, the respective modem in the UE may engage in a power control process with the NB. For instance, for uplink communication by the respective modem in the UE, the NB could regularly evaluate uplink receive-signal-strength from the UE and could send over its respective connection to the UE power control commands (PCCs) that direct adjustments of the UE's transmission power as necessary to help keep the uplink receive-signal-strength at a desired level.

As noted above, presently at issue is a need to ensure compliance with limitations on extraneous emissions, i.e., emissions that occur outside of an uplink frequency channel on which an NB is serving a UE. As noted above, a technological problem in the dual-connectivity scenario is that the UE's concurrent communication on two channels in a common frequency band (by way of example) could combine to produce IM3 products whose PSD could exceed applicable limits.

Figure 3:
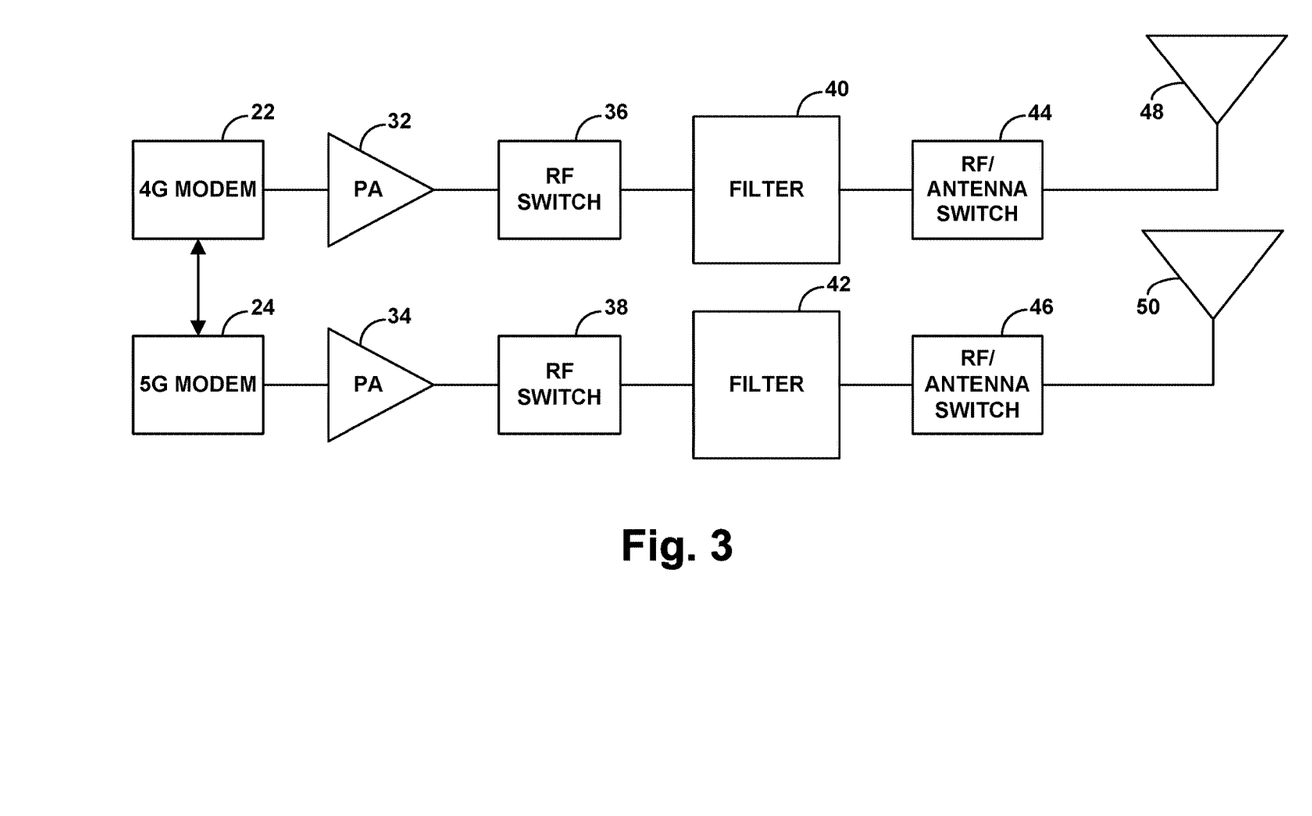
FIG. 3 is a simplified block diagram of an example set of transmit circuits in the UE.

FIG. 3 is a simplified block diagram depicting how components in the UE could be arranged to provide RF transmit chains for the UE's two modems. This diagram is intentionally simplified for ease of illustration. In practice, the UE could include more or fewer components, and the configuration could be otherwise modified.

As shown in FIG. 3, each modem's transmit chain includes a power amplifier (PA) 32, 34 an RF switch 36, 38, a bandpass filter 40, 42, an RF/antenna switch 44, 46, and an antenna block (e.g. one or more antennas) 48, 50. In practice, each modem could control the gain of its respective PA, to control its uplink transmission power.

As noted above, each modem in the example UE could engage in an uplink power-control process by which its serving NB evaluates uplink receive-signal-strength from the UE and transmits PCCs to the UE on a per-TTI basis. A PCC could direct the UE to incrementally increase its transmission power or to incrementally decrease its transmission power.

As further noted above, a UE may be configured with a specific maximum transmit power (e.g., per modem or per channel). In addition, industry specifications or government regulations may limit the UE's maximum transmission power separately for specific channels on which the UE operates, such as per carrier on which it will transmit and/or across multiple carriers on which it will transmit. Further, industry specifications may allow the UE to apply a maximum power reduction (MPR) to further limit its maximum output power in order to comply with emissions limits, with the MPR being based on factors such as the UE's power class (e.g., per device type), the channel bandwidth and the allocated modulation order and quantity of PRBs per TTI. (For instance, the MPR could be greater for wider channel bandwidth, higher-order modulation, and/or greater number of allocated PRBs.)

Still further, the UE may be allowed to apply additional MPR (A-MPR) in certain deployment scenarios, to help ensure compliance with emissions limits. In a single-air-interface scenario, the level of A-MPR could be established according to standard tables that are keyed to factors such as which band the UE is operating on, the bandwidth of the channel on which the UE is operating within that band, the number of PRBs allocated to the UE in the TTI at issue, and what region of the channel bandwidth the allocated PRBs fall in.

In a dual-connectivity arrangement, however, an issue that can arise as discussed above is the interrelationship between (i) the frequency range on which the UE transmits on one carrier and (ii) the frequency range on which the UE transmits concurrently on the other carrier. Depending on the uplink frequency channels of the carriers, depending on how many PRBs are allocated for the UE's use respectively on each carrier, and depending on which PRBs are allocated (e.g., where the allocated PRBs sit in RF frequency spectrum), the UE's concurrent transmission on the two carriers could create IM3 products subject to PSD limits.

To facilitate determining what A-MPR the UE should safely apply for its transmission on a given carrier, the two modems in the device could share with each other information about which uplink PRBs are allocated to the UE on a per-TTI basis. Further, each modem could know which uplink frequency channel it is using and which uplink frequency channel the other modem is using. For instance, the 4G modem could know which uplink frequency channel the 5G modem is using, since RRC signaling through the 4G connection would have been used to establish the 5G connection. And the 4G modem could inform the 5G modem what uplink frequency channel the 4G modem is using.

Figure 4:
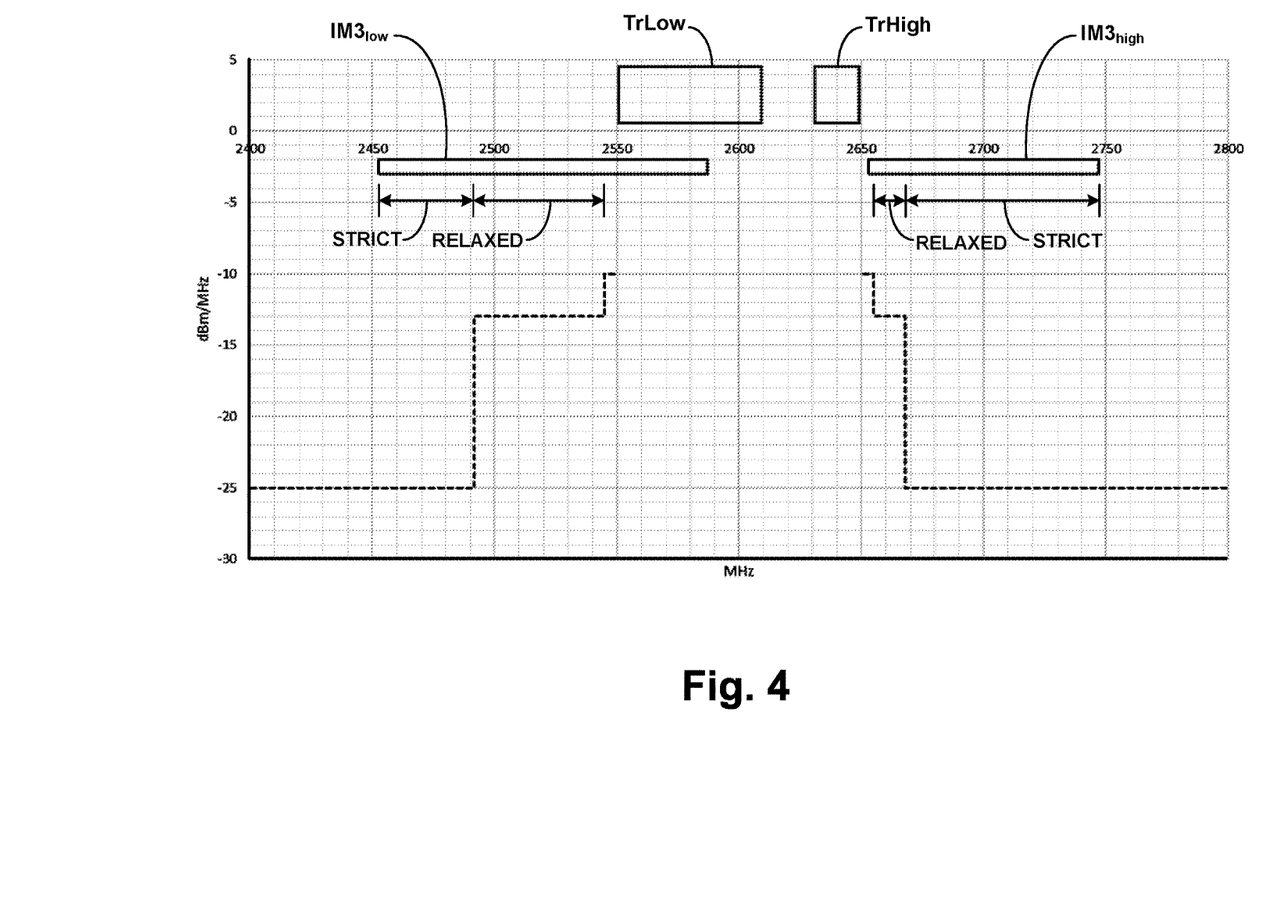
FIG. 4 is an illustration of concurrent non-contiguous transmissions, resulting IM3 products, and applicable PSD limits.
Figure 5:
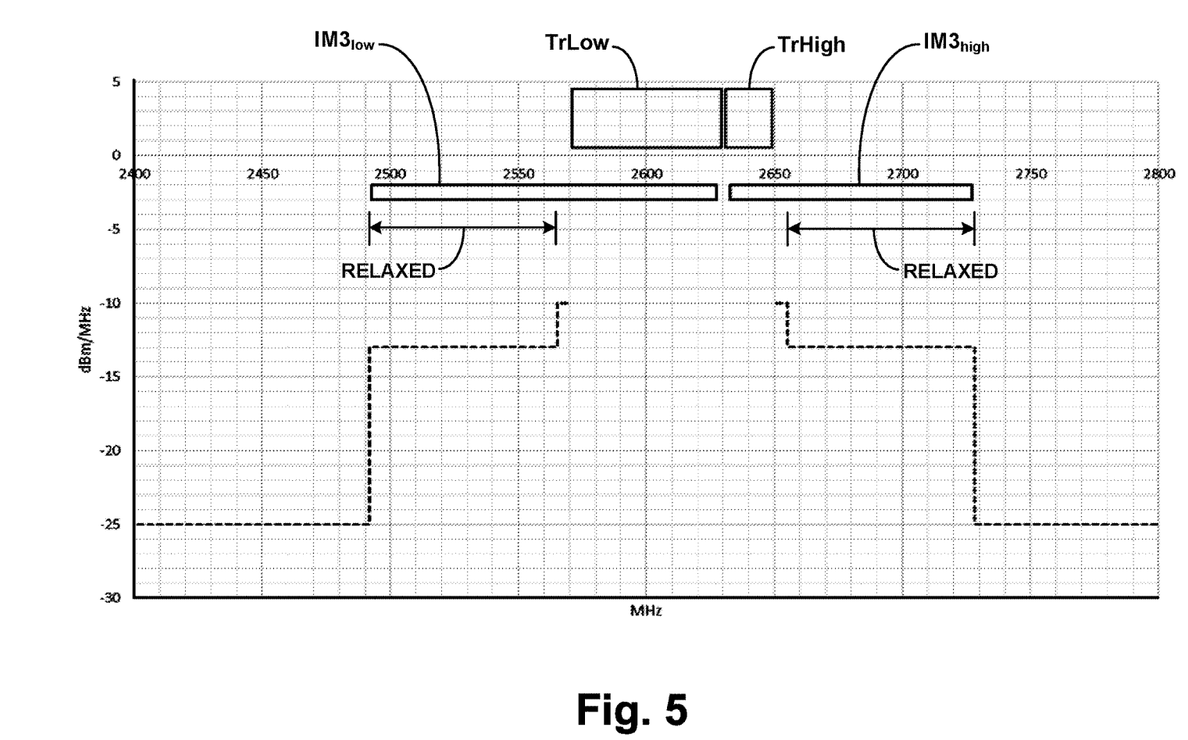
FIG. 5 is an illustration of concurrent contiguous transmissions, resulting IM3 products, and applicable PSD limits.

As noted above, the IM3 products produced from the UE's concurrent transmissions on separate allocated frequency ranges may be subject to SEMs that define PSD limits. FIGS. 4 and 5 illustrate example scenarios with concurrent transmissions, resulting IM3 products, and applicable PSD limits.

For simplicity of illustration, these figures assume that the UE's transmission on each uplink channel is uplink-channel wide, e.g., that the UE has been allocated PRBs across the entirety of the uplink-channel bandwidth. Thus, in the figures, the frequency-range respectively of each illustrated transmission corresponds with the frequency-range of the associated carrier. (In practice, some PRBs at the low end and high end of the uplink channel may be reserved for control signaling, so the uplink allocation would not be across the entire uplink-channel bandwidth. Further, in practical implementation, a UE may receive allocation of a narrower frequency range in a given carrier.)

FIG. 4 depicts a scenario where the UE's transmissions are non-contiguous (not adjacent). In particular, the figure shows a lower-frequency transmission TrLow having an associated frequency range, and a higher-frequency transmission TrHigh having an associated frequency range. Further, the figure shows IM3 products that would result from these transmissions, namely, a lower IM3 product $IM3_{low}$ and a higher IM3 product $IM3_{high}$.

The figure then illustrates a composite SEM defining PSD limits as discussed above. In particular, each side of the SEM defines a relaxed PSD limit (−13 dBm/MHz) for frequencies that are within one channel-bandwidth from the edge of the nearest uplink operating channel, and a strict PSD limit (−25 dBm) for frequencies farther out. Because the channel bandwidths in the illustrated example differ from each other, the frequency range of the upper and lower relaxed PSD limits corresponding differ from each other.

Note also that the SEM may additionally include other limits, some of which are shown in the figure. For instance, the SEM may include even more relaxed limits for frequencies very close to the channel edges and/or even more strict limits for frequencies farther away from the channels. In addition, as noted above, other limits could be incorporated, such as imposing the strict limit for frequencies below 2490.5 MHz or the like. These additional SEM limits could also be considered in accordance with the presently disclosed principals, but this description focuses primarily on just the representative SEM limits for simplicity.

As is shown in FIG. 4, considering each IM3 product, a portion of the IM3 product's frequency range is subject to the relaxed SEM limit, and another portion of the IM3 product's frequency range is subject to the strict SEM limit. Each of these portions defines a respective frequency range that is at issue in the present analysis. (In alternative scenario, it is possible that the IM3 product and SEM limits would be defines such that no portion of the IM3 product's frequency range would be subject to a given SEM limit, in which case the analysis of that SEM limit with respect to that IM3 product would be moot.)

FIG. 5 then depicts another example scenario, this one where the frequency ranges of the UE's two transmissions TrLow and TrHigh are contiguous (adjacent), and thus (in the example where transmission bandwidths correspond with channel bandwidths) where the UE's operating uplink channels are contiguous. This figure also illustrates the resulting IM3 products, $IM3_{low}$ and $IM3_{high}$, having associated frequency ranges, as well as an associated composite SEM defining relaxed and strict PSD limits. As noted above, because the uplink channels in this example are contiguous, their aggregate bandwidth is considered for purposes of defining the frequency range of the relaxed limit. Namely, the relaxed limit on each side applies to frequencies that are within the aggregate-bandwidth from the edge of the nearest uplink operating channel.

In the example of FIG. 5, due to the frequency positioning of the IM3 products and due to the structure of the aggregate SEM, no portion of either IM3 product is subject to the strict PSD limit. However, a portion of each IM3 product is subject to the relaxed SEM limit. In an alternative arrangement, either IM3 product (or each IM3 product) might have a portion subject to the relaxed SIM limit and a separate portion subject to the strict PSD limit, as in FIG. 4. Other examples are possible as well.

Figure 6:
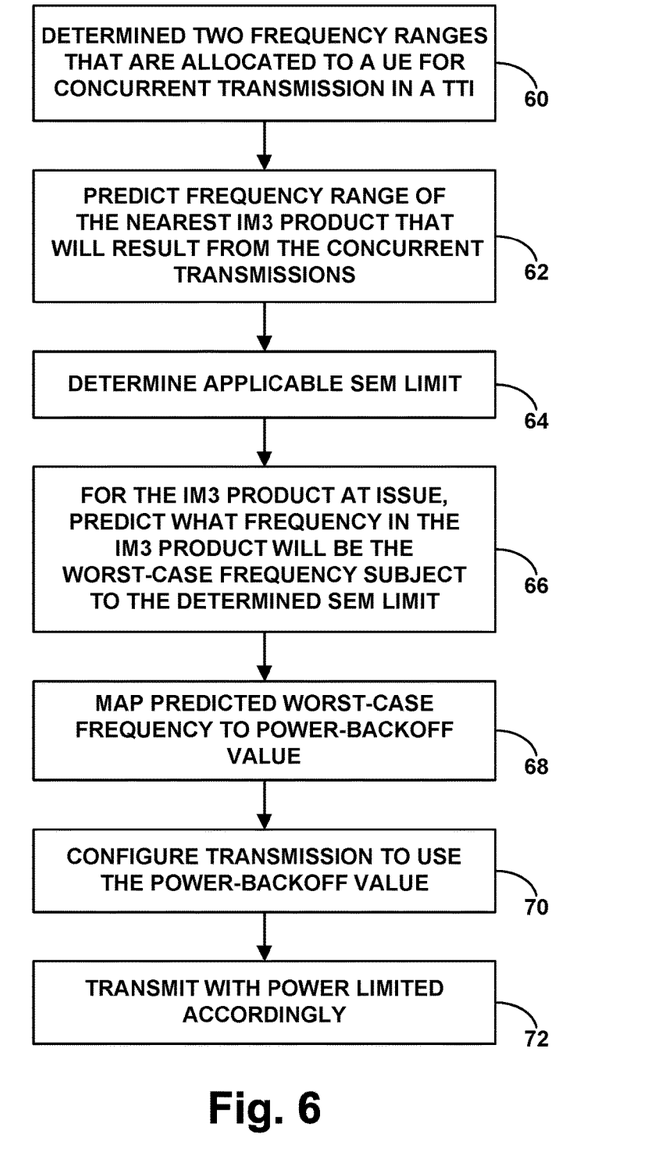
FIG. 6 is a flow chart depicting operations that can be carried out in an example implementation.

FIG. 6 is next a flow chart illustrating a process for controlling power-backoff in accordance with the present disclosure. Steps of the illustrated process could be carried out by a UE that will engage in concurrent transmissions on separate frequency ranges. For instance, the steps could be carried out by a modem or one or more other components of the UE. In the dual-connectivity scenario, these operations could be carried out by one of the UE's modems or by each of the modems. Further, the steps could be carried out on per TTI basis to help provide accurate control of power-backoff per TTI. And the steps could be carried out in an order other than that depicted and described.

To facilitate carrying out the illustrated process, the UE could be pre-provisioned (e.g., in its data storage) with data that defines applicable SEM limits for various uplink channels and/or combinations of uplink channels, such as data that informs the UE of applicable relaxed and strict PSD limits and associated frequency-transition points between those limits (e.g., where in frequency the SEM would transition from the relaxed limit to the strict limit). These SEM-limit definitions could be as described above and/or could take other forms, possibly including additional limits based on specific frequency and/or other factors.

In addition, the UE could be pre-provisioned with mapping tables that correlate various worst-case frequencies (or ranges of frequencies) with associated power-backoff values that are deemed sufficient to keep PSD within applicable limit. These tables could be established empirically based on actual testing or through simulation or other techniques. The UE could include a separate mapping table respectively for each applicable SEM limit, such as one mapping table for the relaxed PSD limit and a separate mapping table for the strict PSD limit. Each mapping table could specify various frequency ranges and for each frequency range could specify a corresponding power-backoff value deemed to be sufficient in that frequency range to meet the SEM limit at issue. In practice, the power-backoff value that is deemed to be sufficient could vary from one frequency (or frequency) to another due to the bandpass filter characteristics noted above or for other reasons.

Further, for each SEM limit, the mapping could specify separate power-backoff values for different bandwidths of the underlying transmissions. This is because the PSD of an IM3 product is generally inversely proportional to the bandwidths of the underlying transmissions, so that if the transmissions occur over wider swaths of frequency, the PSD of resulting IM3 products would be lower, and vice versa. To account for this, the mapping table for each SEM limit could specify separate power-backoff values for each of various ranges of underlying-transmission bandwidth. Here, the relevant transmission bandwidth could be the aggregate bandwidth of the UE's two transmissions. Or considering that the transmission nearest to an IM3 product has twice the influence on the PSD of that IM3 product, the relevant transmission bandwidth could be the sum of the distant transmission's bandwidth and two times the near transmission's bandwidth.

The mapping for each SEM limit could thus be represented as a table in which rows are keyed to ranges of worst-case IM3 frequencies and columns are keyed to ranges of transmission bandwidths, and in which each cell specifies a respective power-backoff value that is deemed (e.g., by empirical testing and/or simulation) to be sufficient to keep PSD within the SEM limit. Other example mappings are possible as well.

Note also that separate such mappings could be established for each of various UE power-classes, considering that different UE power-classes define different baseline maximum transmission-power levels and may therefore need different power-backoff values to accommodate applicable SEM limits. Further, separate mappings could be established respectively for each of various models of UE and modem (and/or other such equipment) to take into account other differences in performance characteristics. In an example implementation, a UE would be provisioned with applicable mapping tables given the UE's power class and possibly other characteristics.

To additionally facilitate the present process, a modem carrying out the process could possess data that indicates the two uplink channels on which the UE will be operating. In the dual-connectivity scenario, the modem carrying out the process would know the uplink channel on which it itself is set to transmit. Further, the modem can receive signaling from the other modem indicating the uplink channel on which the other modem is set to transmit.

Referring to FIG. 6 as an example implementation, at block 60, a modem carrying out the process for a given TTI determines the two frequency ranges that are allocated to the UE for transmission in that TTI. Each such frequency range is a specific swath of frequency in RF spectrum, extending from a defined lower frequency value to a defined upper frequency value. In addition, each such frequency range has a respective bandwidth that is how wide the frequency range is (e.g., computed by subtracting its upper frequency value from its lower frequency value.)

In practice, these frequency ranges could be defined by PRB allocations to the UE. For instance, in dual-connectivity scenario, the modem carrying out the process would have a record of the PRB allocation that it has received for the TTI and would thus know the frequency range (of the allocated PRB(s)) of its transmission, and the modem could also receive a signaling message from the other modem indicating the PRB allocation that the other modem has received for the same TTI and would thus know the frequency range of the other modem's transmission.

In a situation where the two modems do not share this information with each other quickly enough for this to be done on a per TTI basis, the modem carrying out this process could assume that the other modem will be transmitting across its entire useable bandwidth of the other modem's uplink channel.

At block 62, the modem carrying out the process predicts the frequency range of the IM3 product that will be nearest to the modem's transmission and that will result from the two concurrent transmissions. Here, the modem could apply the equations discussed above or other equations that establish frequency range of the nearby IM3 product, given two underlying transmission frequency ranges. The IM3 product at issue here is the one nearest to the modem's transmission. For instance, of the two IM3 products, it is the lower IM3 product if the modem will be engaging in the lower-frequency transmission of the two transmissions. Alternatively, it is the upper IM3 product if the modem will be engaging in the higher-frequency transmissions of the two transmissions.

At block 64, the modem determines an applicable SEM limit, by reference to its provisioned data regarding definitions of SEM limits, based on the two uplink channels' frequency ranges and bandwidths. And at block 66, for the IM3 product at issue, the modem predicts what frequency in the IM3 product will be the worst-case frequency subject to the determined SEM limit.

To predict this worst-case frequency, the modem could take into account one or more bandpass filter characteristics as described above for instance.

If the lower IM3 product is at issue, a reasonable assumption is that PSD will either remain substantially constant across the frequency range of the IM3 product or, due to filter attenuation, will decrease across the frequency range as frequency decreases (e.g., from right to left in FIG. 4 or FIG. 5). As a result, if the SEM limit at issue is the relaxed PSD limit and if any portion of the lower IM3 product is subject to the relaxed PSD limit, then the modem can deem the highest frequency of that portion to be the worst-case frequency. And likewise, if the SEM limit at issue is the strict PSD limit and if any portion of the lower IM3 product is subject to the strict PSD limit, then the modem can deem the highest frequency in that portion to be the worst-case frequency.

Whereas, if the upper IM3 product is at issue, a reasonable assumption is that PSD will either remain substantially constant across the frequency range of the IM3 product or, due to filter attenuation, will decrease across the frequency range as frequency increases (e.g., from left to right in FIG. 4 or FIG. 5). As a result, if the SEM limit at issue is the relaxed PSD limit and if any portion of the upper IM3 product is subject to the relaxed PSD limit, then the modem can deem the lowest frequency of that portion to be the worst-case frequency. And likewise, if the SEM limit at issue is the strict PSD limit and if any portion of the upper IM3 product is subject to the strict PSD limit, then the modem can deem the lowest frequency in that portion to be the worst-case frequency.

Phrased another way, the act of predicting what frequency in the IM3 product will be a worst-case frequency subject to the SEM limit at issue could involve (i) determining a portion of the IM3 product that will be subject to the determined SEM limit, the portion defining a specific range of frequency, and (ii) predicting what frequency in the specific range of frequency will have the highest PSD in the specific range of frequency. And predicting what frequency in the specific range of frequency will have the highest PSD in the specific range of frequency could involve (a) if the IM3 product is the lower IM3 product, then deeming a highest frequency in the specific range of frequency to be the frequency that will have the highest PSD in the specific range of frequency, based on it being the highest frequency and (b) if the IM3 product is the upper IM3 product, then deeming a lowest frequency in the specific range of frequency to be the frequency that will have the highest PSD in the specific range of frequency, based on it being the lowest frequency.

At block 68, the modem then refers to the mapping data to correlate the predicted worst-case frequency to an applicable power-backoff value. For instance, the modem could perform a query in the mapping data to select an associated power-backoff value based on the predicted worst-case frequency. Further, as noted above, the modem could determine a representative bandwidth value of the concurrent transmissions, such as an aggregate of the two transmissions' bandwidths, and the mapping-table lookup could be keyed to that bandwidth.

At block 70, having thus determined the applicable power-backoff value based on the mapping, the modem then configures its transmission to use that power-backoff value. For instance, the modem could signal to the power amplifier in its RF chain to provide the power-backoff value as an adjustment to a maximum transmission power. Or the modem could factor the power-backoff value into its computation of a maximum transmission power, taking into account other reductions from a baseline maximum transmission power, and could cause the amplifier's output power to be limited to the computed maximum transmission power.

At block 72, the modem could then proceed with the transmission with its power limited accordingly. With the limit in place, as the modem receives power up commands from its serving NB, the output power of its transmission could thus be restricted to become no higher than its adjusted maximum power level.

In practice, the modem could carry out this process separately for the relaxed SEM limit and for the strict SEM limit in order to establish two applicable power-backoff values, one for the relaxed SEM limit and one for the strict SEM limit. The modem could then compare those two power-backoff values and select the greater of the two, and the modem could configure its transmission to use that greater power-backoff value, which will safely encompass the other power-backoff value of the two as well.

Phrased another way, the SEM limit could be considered a first SEM limit, the predicted worst-case frequency could be considered a first predicted frequency, the associated power-backoff value could be considered a first associated power-backoff value, and the process could involve (i) determining a second SEM limit that will apply to the IM3 product, (ii) predicting, as a second predicted frequency, what frequency in the IM3 product will be a worst-case frequency subject to the second determined SEM limit, (iii) mapping the second predicted frequency to a second associated power-backoff value, and (iv) determining that the first associated power-backoff value is greater than the second associated power-backoff value. The act of configuring the transmission to use the power-backoff value could then be based further on having determined that the first associated power-backoff value is greater than the second associated power-backoff value.

In addition, in an example implementation, this process could be carried out separately for each transmission (e.g., separately by each modem) so as to establish two power-backoff values, one for one transmission and one for the other transmission. If reason exists to then apply the same power-backoff value for both transmissions, then the process could further involve comparing the two power-backoff values, selecting the greater of the two, and configuring both transmissions to use the selected power-backoff value.

In practice, for instance, if each modem determines a power-backoff value for its own transmission, one modem functioning as an anchor modem could receive a signal from the other modem reporting the other modem's determined power-backoff value, and the anchor modem could then perform the comparison, select the applicable power-backoff value of the two, and signal that selected value to the other modem for use. Both modems could then apply the same, selected power-backoff value. Alternatively, one of the modems could carry out the analysis more generally for itself and for the other modem and could perform the comparison and select, signal, and configure the applicable power-backoff value.

Figure 7:
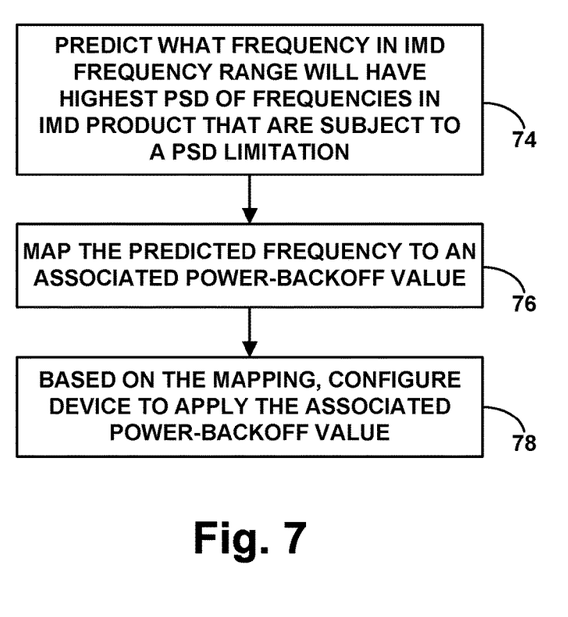
FIG. 7 is another flow chart depicting operations that can be carried out in an example implementation.

FIG. 7 is next another flow chart depicting a method that can be carried out in accordance with the present disclosure, to configure power-backoff in a wireless communication device when the device is going to engage in concurrent transmissions including a first transmission on a first channel and a second transmission on a second channel that is higher in frequency than the first channel, where engaging in the concurrent transmissions will produce intermodulation-distortion (IMD) products, including a first IMD product having a first frequency range and a second IMD product having a second frequency range. This method could similarly be carried out by device, such as by a modem (e.g., the modem providing the first transmission) and/or by one or more other components.

As shown in FIG. 7, at block 74, the method involves predicting what frequency in the first frequency range will have the highest PSD of frequencies in the first 1 MB product that are subject to a PSD limitation. At block 76, the method then involves mapping the predicted frequency to an associated power-backoff value. And at block 78, the method involves, based on the mapping (e.g., having established the associated power-backoff value through the mapping), configuring the device to apply the associated power-backoff value for wireless transmission.

In this method, in line with the discussion above, the act of predicting what frequency in the first frequency range will have the highest PSD of frequencies in the first 1 MB product that are subject to the PSD limitation could involve (i) determining a portion of the first frequency range that is subject to the PSD limitation, wherein the portion extends from a low-end frequency to a high-end frequency, and (ii) based on the high-end frequency being the highest frequency in the determined portion, predicting that the high-end frequency will have the highest PSD of frequencies in the first IMD product that are subject to the PSD limitation.

Further, the mapping of the predicted frequency to the associated power-backoff value could involve referring to mapping data that correlates various frequencies to associated power-backoff values (to select an associated power-backoff value based on the predicted frequency) and could additionally be based on a representative bandwidth of the concurrent transmissions.

And still further, the method could be carried out in various scenarios as noted above. For instance, the method could be carried out in a dual-connectivity scenario and/or in a carrier-aggregation scenario as noted above.

As noted above, features of this process could be implemented by a UE, such as by one or more modems in the UE, to engage in dynamic control of uplink transmission power. The UE could include at least two modems, including a first modem supporting wireless communication according to a first air interface protocol and a second modem supporting wireless communication according to a second air interface protocol. Further, the UE could include a first power amplifier for amplifying uplink transmissions from the first modem, the first modem controlling gain of the first power amplifier and applies a first maximum-power reduction in setting a maximum output power of the first amplifier, and a second power amplifier for amplifying uplink transmissions from the second modem, the second modem controlling gain of the second power amplifier and applies a second maximum-power reduction in setting a maximum output power of the second amplifier.

In that arrangement, the first modem could be configured to adjust the first maximum-power reduction by a power-backoff value determined through a process including (i) predicting what frequency in an intermodulation-distortion (IMD) product resulting from concurrent transmissions by the first and second modem will have a highest power spectral density (PSD) of frequencies in the IMD product that are subject to a PSD limitation, (ii) mapping the predicted frequency to an associated power-backoff value, and (iii) adjusting the first maximum-power reduction by the associated power-backoff value.

Further, as discussed above, the concurrent transmissions will produce two IMD products, one lower in frequency than the other, where the IMD product lower in frequency than the other is a lower IMD product and the other IMD product is an upper IMD product. And the act of predicting what frequency in the IMD product will have the highest PSD of frequencies in the IMD product that are subject to the PSD limitation could involve (i) determining what frequency-range portion of the IMD product will be subject to the PSD limitation, where the frequency-range portion extends from a low-end frequency to a high-end frequency, (ii) if the IMD product is the lower IMD product, then deeming a highest frequency in the determined frequency-range portion to be the frequency that will have the highest PSD of frequencies in the IMD product that are subject to the PSD limitation, based on the highest frequency being the highest frequency, and (iii) if the IMD product is the upper IMD product, then deeming a lowest frequency in the determined frequency-range portion to be the frequency that will have the highest PSD in of frequencies in the IMD product that are subject to the PSD limitation, based on the lowest frequency being the lowest frequency. Further, other features discussed above could be applied in this context, and vice versa.

In an alternative embodiment, some or all of the features could be carried out by a serving NB and/or one or more other entities, resulting in signaling to configure the UE's transmission accordingly. And a non-transitory computer readable medium could be encoded with or could otherwise embody program instructions executable by one or more processing unit to carry out and/or cause to be carried out the described features.

Further, as noted above, the features disclosed could be applied in other scenarios where a UE is going to transmit concurrently on two separate frequency ranges. And similar features could be applied as well where two UEs will transmit in close enough proximity to each other to risk creating IM3 products. In addition, the principles disclosed could be applied as well with respect to other IMD products, not limited to IM3 products. Moreover, various features disclosed could be extended to apply with more than two concurrent transmissions, such as by considering each of various pairs of transmission frequency-ranges for example.

Exemplary embodiments have been described above. Those skilled in the art will understand, however, that changes and modifications may be made to these embodiments without departing from the true scope and spirit of the invention.

We claim:

1. A method to configure power-backoff in a wireless communication device when the device is going to engage in concurrent transmissions including a first transmission on a first channel and a second transmission on a second channel that is higher in frequency than the first channel, wherein engaging in the concurrent transmissions will produce intermodulation-distortion (1 MB) products, including a first IMD product having a first frequency range and a second IMD product having a second frequency range, the method comprising:
    predicting the first frequency range of the first IMD product that engaging in the concurrent transmissions will produce;
    predicting what frequency in the first frequency range will have the highest power spectral density (PSD) of frequencies in the first 1 MB product that are subject to a PSD limitation;
    mapping the predicted frequency to an associated power-backoff value; and
    based on the mapping, configuring the device to apply the associated power-backoff value.

2. The method of claim 1, wherein predicting what frequency in the first frequency range will have the highest PSD of frequencies in the first 1 MB product that are subject to the PSD limitation comprises:
    determining a portion of the first frequency range that is subject to the PSD limitation, wherein the portion extends from a low-end frequency to a high-end frequency; and
    based on the high-end frequency being the highest frequency in the determined portion, predicting that the high-end frequency will have the highest PSD of frequencies in the first 1 MB product that are subject to the PSD limitation.

3. The method of claim 1, wherein mapping the predicted frequency to the associated power-backoff value comprises referring to mapping data that correlates various frequencies to associated power-backoff values, to select the associated power-backoff value based on the predicted frequency.

4. The method of claim 3, wherein the mapping is further based on a representative bandwidth of the concurrent transmissions.

5. The method of claim 1, wherein the device has at least two modems, including a first modem providing the first transmission and a second modem providing the second transmission, the method being carried out by the first modem.

6. The method of claim 1, carried out in a dual-connectivity scenario.

7. The method of claim 1, carried out in a carrier-aggregation scenario.

8. A method for controlling power-backoff in a user equipment device (UE), the method comprising:
    determining two frequency ranges that are allocated to the UE for transmission in a given transmission time interval, wherein the UE will engage in concurrent transmissions on the two frequency ranges;

predicting a frequency range of a third-order intermodulation-distortion (IM3) product that will be produced by the concurrent transmissions;

determining a spectral-emission-mask (SEM) limit that will apply to the IM3 product;

predicting what frequency in the IM3 product will be a worst-case frequency subject to the determined SEM limit;

mapping the predicted worst-case frequency to an associated power-backoff value; and based on the mapping, configuring transmission on at least one of the two frequency ranges to use the associated power-backoff value.

9. The method of claim 8, wherein configuring transmission on at least one of the two frequency ranges to use the associated power-backoff value comprises configuring both transmissions to use the associated power-backoff value.

10. The method of claim 8, wherein the SEM limit is a first SEM limit, the predicted worst-case frequency is a first predicted frequency, the associated power-backoff value is a first associated power-backoff value, the method further comprising:

determining a second SEM limit that will apply to the IM3 product;

predicting, as a second predicted frequency, what frequency in the IM3 product will be a worst-case frequency subject to the second determined SEM limit;

mapping the second predicted frequency to a second associated power-backoff value; and determining that the first associated power-backoff value is greater than the second associated power-backoff value, wherein the configuring is based further on the determining that the first associated power-backoff value is greater than the second associated power-backoff value.

11. The method of claim 8, carried out in a dual-connectivity scenario.

12. The method of claim 8, carried out in a carrier-aggregation scenario.

13. The method of claim 8, wherein predicting what frequency in the IM3 product will be a worst-case frequency subject to the determined SEM limit comprises:

determining a portion of the IM3 product that will be subject to the determined SEM limit, the portion defining a specific range of frequency; and predicting what frequency in the specific range of frequency will have the highest PSD in the specific range of frequency.

14. The method of claim 13, wherein the transmissions will product two IM3 products, one lower in frequency than the other, wherein the IM3 product lower in frequency than the other is a lower IM3 product and the other IM3 product is an upper IM3 product, and wherein predicting what frequency in the specific range of frequency will have the highest PSD in the specific range of frequency comprises:

if the IM3 product is the lower IM3 product, then deeming a highest frequency in the specific range of frequency to be the frequency that will have the highest PSD in the specific range of frequency, based on the highest frequency being the highest frequency; and if the IM3 product is the upper IM3 product, then deeming a lowest frequency in the specific range of frequency to be the frequency that will have the highest PSD in the specific range of frequency, based on the lowest frequency being the lowest frequency.

15. The method of claim 8, wherein mapping the predicted worst-case frequency to the associated power-backoff value comprises referring to mapping data that correlates various frequencies to associated power-backoff values.

16. The method of claim 15, wherein the mapping is further based on a representative bandwidth of the concurrent transmissions.

17. A user equipment device (UE) with dynamic control of uplink transmission power, the UE comprising:

at least two modems, including a first modem supporting wireless communication according to a first air interface protocol and a second modem supporting wireless communication according to a second air interface protocol;

a first power amplifier for amplifying uplink transmissions from the first modem, wherein the first modem controls gain of the first power amplifier and applies a first maximum-power reduction in setting a maximum output power of the first amplifier; and a second power amplifier for amplifying uplink transmissions from the second modem, wherein the second modem controls gain of the second power amplifier and applies a second maximum-power reduction in setting a maximum output power of the second amplifier, wherein the first modem is configured to adjust the first maximum-power reduction by a power-backoff value determined through a process including (i) predicting what frequency in an intermodulation-distortion (1 MB) product resulting from concurrent transmissions by the first and second modem will have a highest power-spectral density (PSD) of frequencies in the 1 MB product that are subject to a PSD limitation, (ii) mapping the predicted frequency to an associated power-backoff value, and (iii) adjusting the first maximum-power reduction by the associated power-backoff value.

18. The UE of claim 17, wherein the concurrent transmissions will produce two IMD products, one lower in frequency than the other, wherein the IMD product lower in frequency than the other is a lower IMD product and the other IMD product is an upper IMD product, and wherein predicting what frequency in the 1 MB product will have the highest PSD of frequencies in the IMD product that are subject to the PSD limitation comprises:

determining what frequency-range portion of the 1 MB product will be subject to the PSD limitation, wherein the frequency-range portion extends from a low-end frequency to a high-end frequency;

if the IMD product is the lower IMD product, then deeming a highest frequency in the determined frequency-range portion to be the frequency that will have the highest PSD of frequencies in the 1 MB product that are subject to the PSD limitation, based on the highest frequency being the highest frequency; and if the 1 MB product is the upper 1 MB product, then deeming a lowest frequency in the determined frequency-range portion to be the frequency that will have the highest PSD in of frequencies in the 1 MB product that are subject to the PSD limitation, based on the lowest frequency being the lowest frequency.

19. The UE of claim 17, wherein mapping the predicted frequency to the associated power-backoff value comprises referring to mapping data that correlates various frequencies to associated power-backoff values.

20. The method of claim 19, wherein the mapping is further based on a representative bandwidth of the concurrent transmissions.

\* \* \* \* \*